Sept. 5, 1961 L. O. DAVIS 2,998,970
LOAD SPRING SUSPENSION AND LEVELLING DEVICE
Filed Nov. 21, 1958 2 Sheets-Sheet 1
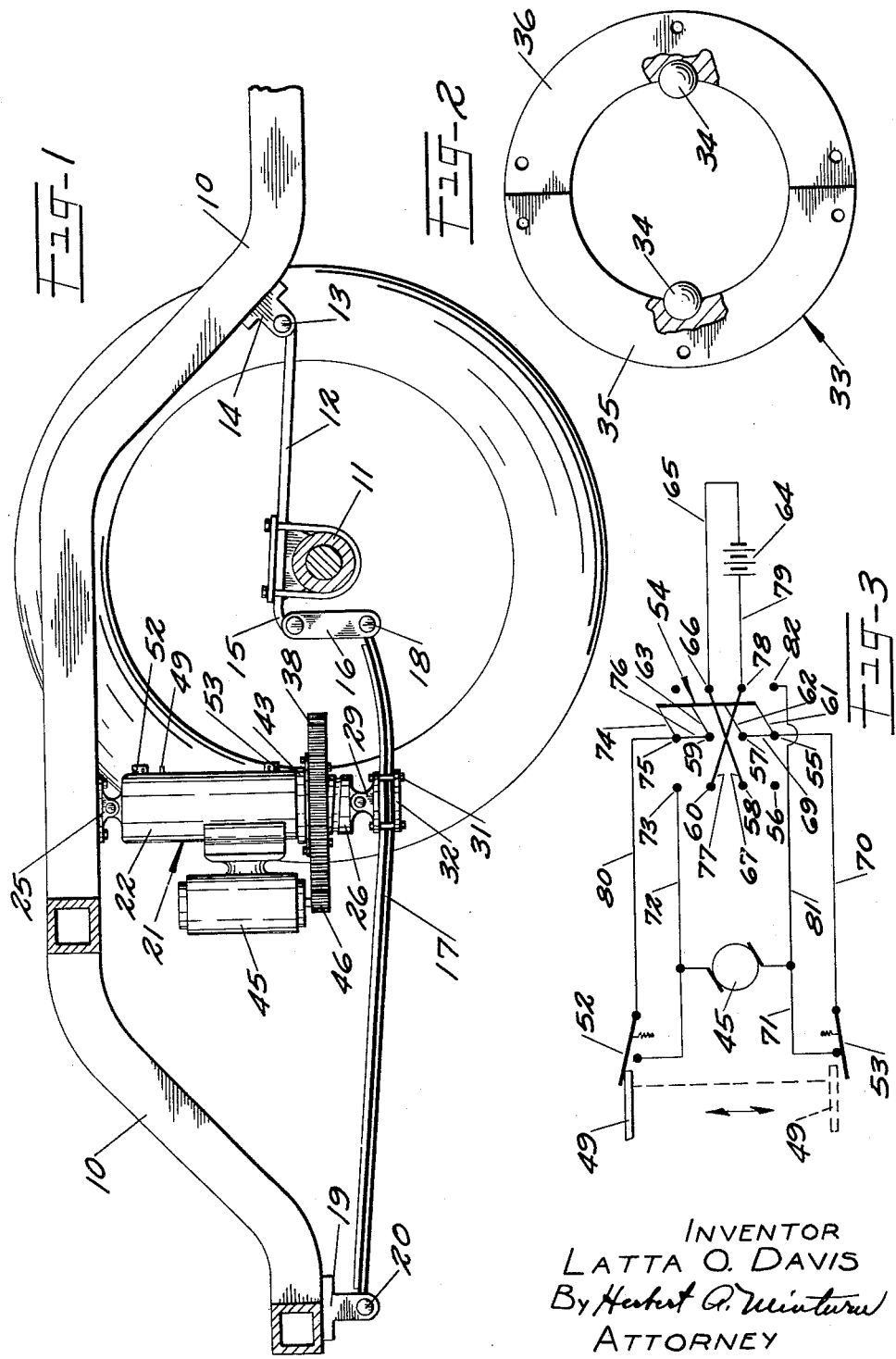
INVENTOR
LATTA O. DAVIS
By Herbert P. Minturn
ATTORNEY Sept. 5, 1961  L. O. DAVIS  2,998,970
LOAD SPRING SUSPENSION AND LEVELLING DEVICE
Filed Nov. 21, 1958  2 Sheets-Sheet 2

INVENTOR
LATTA O. DAVIS
By Herbert Q. Minturn
ATTORNEY

United States Patent Office 2,998,970
Patented Sept. 5, 1961

2,998,970
LOAD SPRING SUSPENSION AND LEVELLING DEVICE
Latta O. Davis, 1647 N. Belleview Place, Indianapolis 21, Ind.
Filed Nov. 21, 1958, Ser. No. 775,645
2 Claims. (Cl. 267—19)

This invention relates to a novel construction particularly adapted for use in automotive fields such as on automobiles and trucks.

It is a primary purpose of the invention to provide a controlled spring suspension particularly at the rear end of the vehicle wherein the load may be spring carried and the drive from the rear axle is taken through a rigid member on each side of the frame from spaced apart zones on the axle, and the variation in height of the rear portion of the frame may be controlled such for example as maintaining the frame at a normal level above the ground regardless of heavy, light, or no load.

Further important objects of the invention reside in the extreme simplicity of the structure embodying the invention; the safety factor resulting from the controlled drive; and the relatively low cost of production of the inventive structure.

These and many other objects and advantages of the invention will become apparent to those versed in the art in the following description of one particular form of the invention as illustrated more or less diagrammatically in the accompanying drawings, in which FIG. 1 is a view in vertical section toward the left hand end of an axle of a structure to which the invention is applied;

FIG. 2 is a view on an enlarged scale in top plan and partial section of a ball thread plate assembly;

FIG. 3 is a wiring diagram illustrating one particular manner of electrical control of the drive of the load levelling device;

Figures 4, 5:
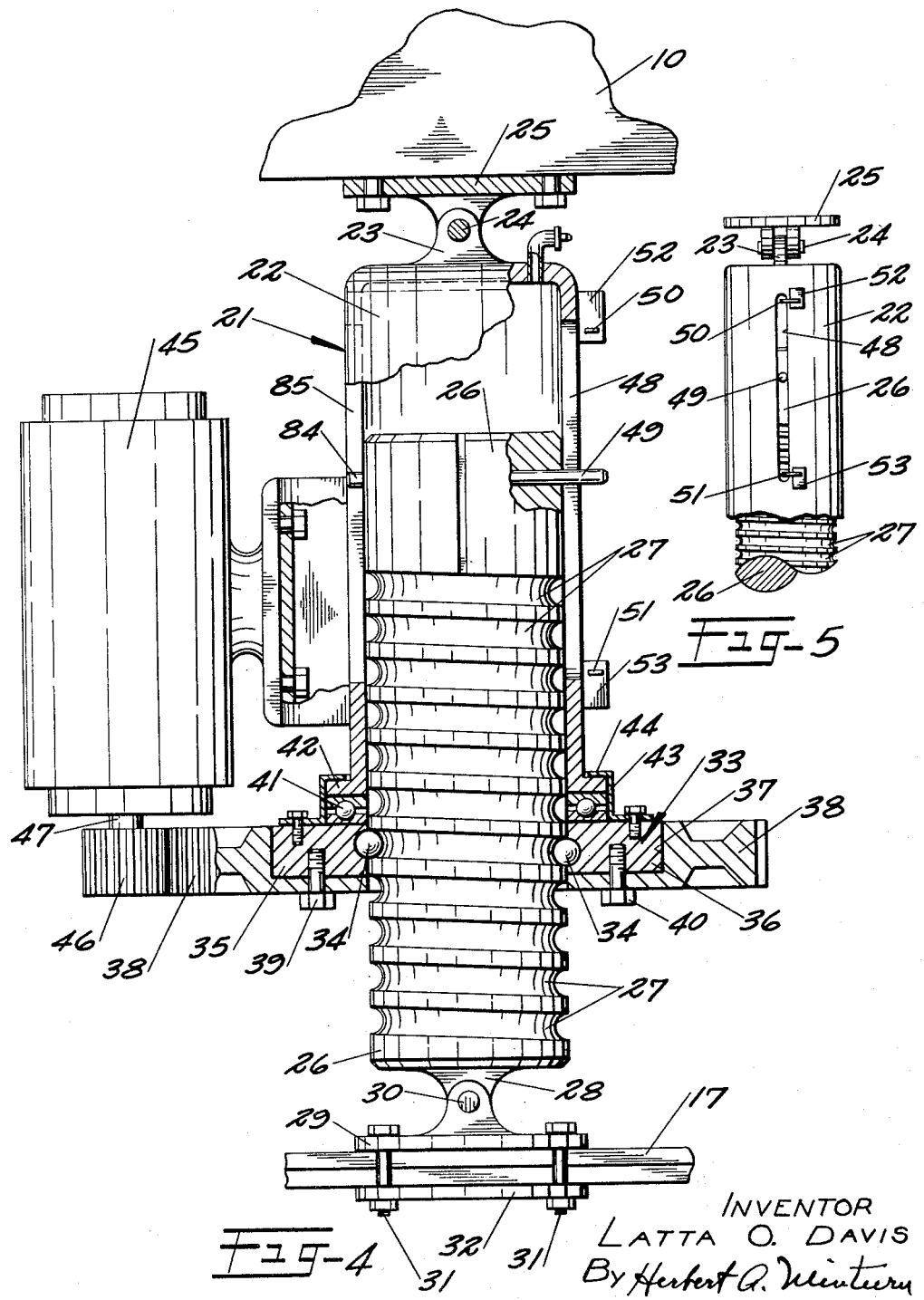
FIG. 4 is a view on an enlarged scale in side elevation and partial section of the load levelling mechanism.
FIG. 5 is a view in side elevation of a detail of the load support.

Referring to FIG. 1, the invention is illustrated as being incorporated as one example on the left hand side of a frame member 10, toward the left hand end of the axle housing 11. It is to be understood that this same mechanism about to be described is duplicated for the right hand end of the axle and side of the frame.

A rigid bar 12 is rockably attached to the frame member 10 by a bolt 13 through the frame carried bracket 14. The bar 12 extends rearwardly from this connection to be fixed in respect to rotation on the axle housing 11 by any suitable means. In the form herein shown, the bar 12 has an extension 15 rearwardly of its mounting on the axle housing 11, and rockably carries the upper end portion of a spring shackle 16 which normally hangs downwardly and rockably therefrom.

The forward end of a leaf spring 17 (will have a greater number of leaves in actual practice than is illustrated) is rockably supported by the lower end of the spring shackle 16 by the bolt 18. This spring 17 extends rearwardly to a bracket 19 which is fixed on the frame member 10. The rear end of the spring 17 is rockably attached to this bracket 19 by a bolt 20.

A load bearing and levelling device and generally designated by the numeral 21 is rockably fixed to the frame member 10 and also to the spring 17 rearwardly of the shackle 16 and forwardly of the bracket 19, herein shown as being toward the forward end of the spring 17.

This member 21 may be of a fixed length, but is herein shown as being of a selective adjustable length for the purpose of levelling the frame 10 in accordance with the load placed or carried thereon. In either event, it is to be seen that the drive of the vehicle through the frame 10 is taken directly from the axle housing 11 through the rigid bar 12 so that there is no driving either forwardly or in reverse through the spring 17. Neither is there any long torque tube or member which may whip under speed conditions or under rough roadway vibrations.

The load carrying member 21 is illustrated in detail in FIG. 4. A cylinder 22 is closed at the upper end and open at its lower end, and this upper end carries an eye member 23 in turn rockably engaged through a transverse bolt 24 with a bracket 25 which in turn is secured to the frame member 10.

There is a screw shaft 26 with external threads 27, slidingly engaging through the lower end of the cylinder 22 in a relatively sliding fit therein. The lower end of the screw shaft 26 has a finger 28 which is rockably attached to a bracket 29 by means of a bolt 30, and the bracket in turn is fixed on the spring 17 by any suitable means, herein shown as by bolts 31 interengaging with an under plate 32.

The screw shaft 26 is held against rotation on its central vertical axis by reason of the member 28 being held on the bolt 30. A bearing plate 33 is provided to have internal thread means engaging with the threads 27 of the shaft 26. In the form herein shown, the plate 33 is divided into two semicircular sections, each section carrying at a diametrically opposed zone in reference to the other section a metal ball bearing 34. The ball is imbedded to substantially half its diameter within the two sections 35 and 36 of the bearing plate 33.

These two sections 35 and 36 are held within a recess 37 provided on the upper side of a spur gear 38, and are fixed thereto in driving relation by any suitable means, herein shown as by cap screws 39 and 40.

Interposed across the topsides of the plate sections 35 and 36 is a ball bearing thrust member 41, bearing between the top faces of those two sections and the under end 42 of the cylinder 22, herein shown as constituting a flange. It is preferred that the cylinder 22 and the spur gear 38 be held without separation from the bearing 41, and in order to accomplish that, a housing 43 is provided to be secured by its lower end to the plates 35 and 36; and extend upwardly surrounding the bearing 41, the end 42 and over on top thereof by the annular flange 44.

A reversible direct current motor 45 is fixed to the side of the cylinder 22 in any suitable manner, and has its shaft in parallel alignment with the axis of both the screw shaft 26 and the cylinder 22. A spur gear 46 is fixed on the lower end of the drive shaft 47 and is in constant mesh with the spur gear 38.

The cylinder 22 carries a vertically disposed slot 48, and a pin 49 slidingly extends through the slot 48 and is held in the upper end of the shaft 26. This pin 49 extends from the outer side of the cylinder 22 a sufficient distance to be in the path of operating levers 50 and 51 of electric switches 52 and 53 respectively. These switches 52 and 53 are biased to normally closed circuit conditions. In order to permit removing of the pin 49, this pin 49 may extend diametrically through the screw shaft 26 and have an end 84 exposed along a cylinder side slot 85 so that access may be had to that end 84 in order to drive the pin 49 outwardly in case disassembly of the device is required or some accident may happen to the projecting end of the pin 49 so as to prevent it operating the switch levers 50 and 51.

Operation

The operation of the particular mechanism described as embodying one form of the invention is as follows.

Assuming in reference to FIG. 4, that there is about an average load on the frame 10, the screw shaft 26 will extend partially from below the underside of the cylinder 22 to have that load transmitted through the cylinder and the screw shaft to the spring 17. The pin 49 will be extending outwardly as indicated in FIG. 4, being positioned intermediate the limit switch operating arms 51 and 50. It will further be assumed that the lower limit switch 53 is in a closed position and that the upper limit switch 52 is in also a closed position. The relative positions of the screw shaft 26 and the cylinder 22 will remain constant as to extension of the shaft 26 from the cylinder 22 until the motor 45 may be operated in either direction depending upon the change in load conditions. Further assuming, that there is an additional load applied to the frame 10 and it is desired to bring the frame 10 back up to a normal predetermined level, it then becomes necessary to cause the screw shaft 26 to be further extended from the cylinder 22. In this case, a switch generally designated by the numeral 54 will be manipulated to cause an interconnection to be made between terminals 55, 56; 57, 58; 59, and 60 through the respective switch blades 61, 62, and 63, FIG. 3.

This operation of the switch 54 sets up a current flow from the battery 64 through the wires 65 to a terminal 66 in the switch, across the bus bar 67 to the terminal 58. From the terminal 58 the circuit continues through the switch blade 62, terminal 57, terminal 55 through the interconnector 69, and the wire 70 to the switch 53 which is in the closed condition.

From the switch 53, the circuit continues through the wire 71 to the motor 45, from which the circuit continues through the wire 72 (switch 52 having been opened previously), to the terminal 73, the switch blade 74, blade terminal 75, across the interconnector 76 to the switch terminal 59, the switch blade 63, terminal 60, across the bus bar 77, to the switch terminal 78, and thence by the wire 79 back to the battery 64.

With that circuit established, the motor 45 is set into operation to drive the gears 46 and 38 until the screw shaft 26 is extended from the cylinder 22, at which time the switch 54 is manipulated to bring it to the "open" position as indicated in FIG. 3. While it has been indicated above that the switch 52 was in opened condition, as shown in FIG. 3, this switch 52 likewise may be closed, at the time it is desired to extend the screw shaft 26 from the cylinder 22, in which case no difference is made in the actual operating result through the circuit described with exception that the wire 80 through the closed switch 52 would then serve as a member energized within the circuit, but having no effect as to the driving of the motor 45.

Now assuming that the load has been removed from the frame 10, and the frame 10 is elevated to a position above the indicated predetermined level, both switches 52 and 53 being closed where the pin 49 has not been carried to the extreme limit of permissible travel toward the switch 53, the switch 54 is thrown to the right to set up a reverse current driving condition in the motor 45. The circuit then established in the reversing of the motor 45 to cause the gears 46 and 38 to turn in order to retract the screw shaft 26 relative to the cylinder 22 is as follows.

The circuit is established from the battery 64 through the wire 65 to the terminal 66, through the switch blade 63, terminal 59, interconnector 76, terminal 75, wire 80, switch 52, and the motor 45, from which motor 45, the current circuit is established through the wire 81, terminal 82, switch blade 61, terminal 55, interconnector 69, terminal 57, switch blade 62, terminal 78, and wire 79 back to the battery 64. The leveling of the frame 10 is completed then at the desired level thereof by opening the switch 54, but in the event the switch 54 may not be opened, the circuit is broken when the pin 49 comes toward the limit of permissible travel, at which time it comes into the path of the switch arm 50 and opens that switch 52 thereby interrupting the circuit just described. Likewise should the pin 49 not be stopped toward its lower limit of travel in accordance with the extension of the screw shaft 26, the pin 49 will come down and open the switch 53 thereby interrupting the first above described circuit in reference to the extension of the shaft 26 from the cylinder 22.

It has been found that the structure embodying the invention as above described greatly inhibits tendency of the frame 10 to pitch under braking and accelerating actions in an automobile.

Thus it is to be seen that I have presented a unique structure first in the spring suspension of the frame 10 and drive through the rigid bar 12 made possible by the intervening load "strut" member 21, which may remain fixed, or may be varied in length through the operation of the electric motor 45. Therefore while I have herein described and shown my invention in the one particular form, it is obvious that structural changes may be employed, such as the provision of a hydraulic motor for shifting the screw shaft 26 in place of the use of an electrical motor, and likewise in other members of the assembly, all without departing from the spirit of the invention, and I therefore do not desire to be limited to that precise form beyond the limitations which may be imposed by the following claims.

I claim:

1. A load adjustable suspension device comprising a vehicle frame; a frame carrying axle; a radius bar fixed by one end portion to said axle and extending from one side thereof to said frame by its opposite end portion; means rockably engaging the said opposite end portion to said frame on a fixed axis; a load carrrying leaf spring; means rockably interconnecting one end of the spring with said axle; said spring extending therefrom in a direction opposite from that of said radius rod; means rockably interconnecting the other end of said spring with said frame; one of said interconnecting means including a rockable shackle; a strut having one end fixed to said frame and its other end fixed to said spring in spaced position from each of said interconnecting means, the load on said frame being carried through said strut to said spring, the spring fulcruming under load about the strut; said strut consisting of a jack; and remotely controlled means varying the effective length of the jack.

2. A load adjustable suspension device comprising a vehicle frame; a frame carrying axle; a radius bar fixed by one end portion to said axle and extending from one side thereof to said frame by its opposite end portion; means rockably engaging the said opposite end portion to said frame on a fixed axis; a load carrying leaf spring; means rockably interconnecting one end of the spring with said axle; said spring extending therefrom in a direction opposite from that of said radius rod; means rockably interconnecting the other end of said spring with said frame; one of said interconnecting means including a rockable shackle; a strut having one end fixed to said frame and its other end fixed to said spring in spaced position from each of said interconnecting means, the load on said frame being carried through said strut to said spring, the spring fulcruming under load about the strut; said fixed ends including pivot means permitting said strut to rock relative to the frame and also relative to the spring under said fulcruming.

References Cited in the file of this patent

UNITED STATES PATENTS

| 1,429,411 | Davidson | Sept. 19, 1922 |
| 1,543,969 | Young | June 30, 1925 |

(Other references on following page)

UNITED STATES PATENTS

| | | | |
|---|---|---|---|
| 2,191,211 | Krotz | Feb. 20, 1940 |
| 2,224,717 | Austin | Dec. 10, 1940 |
| 2,301,398 | Haynes | Nov. 10, 1942 |
| 2,824,733 | Nallinger | Feb. 25, 1958 |

FOREIGN PATENTS

| | | |
|---|---|---|
| 139,299 | Great Britain | Mar. 4, 1920 |
| 311,097 | Great Britain | May 9, 1929 |
| 803,715 | Germany | Apr. 9, 1951 |
| 78,059 | Norway | Feb. 5, 1951 |